United States Patent
Awtar et al.

(10) Patent No.: US 7,703,774 B2
(45) Date of Patent: Apr. 27, 2010

(54) SHAFT SEAL USING SHINGLE MEMBERS

(75) Inventors: Shorya Awtar, Clifton Park, NY (US); William Edward Adis, Scotia, NY (US); Mark William Kowalczyk, Amsterdam, NY (US); Norman Arnold Turnquist, Sloansville, NY (US)

(73) Assignee: General Electric Company, Schenectady, NY (US)

( * ) Notice: Subject to any disclaimer, the term of this patent is extended or adjusted under 35 U.S.C. 154(b) by 683 days.

(21) Appl. No.: 11/519,044

(22) Filed: Sep. 12, 2006

(65) Prior Publication Data

US 2008/0061513 A1    Mar. 13, 2008

(51) Int. Cl.
*F16J 15/447* (2006.01)

(52) U.S. Cl. .................. 277/412; 277/417; 277/420

(58) Field of Classification Search ............. 277/355, 277/412, 543, 417, 420
See application file for complete search history.

(56) References Cited

U.S. PATENT DOCUMENTS

| | | | |
|---|---|---|---|
| 4,526,509 A | 7/1985 | Gay, Jr. et al. | |
| 4,811,961 A * | 3/1989 | Williams | 277/545 |
| 5,031,922 A * | 7/1991 | Heydrich | 277/355 |
| 5,135,237 A | 8/1992 | Flower | |
| 5,749,584 A | 5/1998 | Skinner et al. | |
| 5,755,445 A | 5/1998 | Arora | |
| 5,941,685 A | 8/1999 | Bagepalli et al. | |
| 5,961,125 A | 10/1999 | Wolfe et al. | |
| 5,961,280 A | 10/1999 | Turnquist et al. | |
| 5,971,400 A | 10/1999 | Turnquist et al. | |
| 6,027,121 A | 2/2000 | Cromer et al. | |
| 6,030,175 A | 2/2000 | Bagepalli et al. | |
| 6,045,134 A | 4/2000 | Turnquist et al. | |
| 6,053,699 A | 4/2000 | Turnquist et al. | |
| 6,079,945 A | 6/2000 | Wolfe et al. | |
| 6,105,966 A | 8/2000 | Turnquist et al. | |
| 6,105,967 A | 8/2000 | Turnquist et al. | |
| 6,131,910 A | 10/2000 | Bagepalli et al. | |
| 6,131,911 A | 10/2000 | Cromer et al. | |
| 6,139,018 A | 10/2000 | Cromer et al. | |

(Continued)

FOREIGN PATENT DOCUMENTS

EP        0 391 676        10/1990

(Continued)

OTHER PUBLICATIONS

Nakane, H. et al., "The Development of High Performance Leaf Seals," Proceedings of ASME Turbo Expo 2002, Jun. 3-6, 2002, Amsterdam, Netherlands, pp. 1-9.

(Continued)

*Primary Examiner*—Alison K Pickard
(74) *Attorney, Agent, or Firm*—Nixon & Vanderhye P.C.

(57) ABSTRACT

A shaft seal reduces leakage between a rotating shaft such as a rotor and a stator. The shaft seal or shingle seal includes a plurality of compliant-plate members attached to the stator in facing relation. The compliant-plate members define a sealing ring between the stator and the rotating shaft. Each of the compliant-plate members includes a plurality of shingles, where adjacent compliant-plate members are disposed relative to each other such that the shingles are at least partially staggered in a direction of axial leakage.

15 Claims, 15 Drawing Sheets

U.S. PATENT DOCUMENTS

| | | | |
|---|---|---|---|
| 6,139,019 | A | 10/2000 | Dinc et al. |
| 6,168,162 | B1 | 1/2001 | Reluzco et al. |
| 6,196,550 | B1 | 3/2001 | Arora et al. |
| 6,220,602 | B1 | 4/2001 | Webster et al. |
| 6,250,640 | B1 | 6/2001 | Wolfe et al. |
| 6,250,641 | B1 | 6/2001 | Dinc et al. |
| 6,257,586 | B1 | 7/2001 | Skinner et al. |
| 6,260,269 | B1 | 7/2001 | Turnquist et al. |
| 6,261,057 | B1 | 7/2001 | Turnquist et al. |
| 6,267,381 | B1 | 7/2001 | Wright |
| 6,286,211 | B1 | 9/2001 | Turnquist et al. |
| 6,308,958 | B1 | 10/2001 | Turnquist et al. |
| 6,331,006 | B1 | 12/2001 | Baily et al. |
| 6,343,792 | B1 | 2/2002 | Shinohara et al. |
| 6,364,316 | B1 | 4/2002 | Arora |
| 6,367,806 | B1 | 4/2002 | Turnquist et al. |
| 6,428,009 | B2 | 8/2002 | Justak |
| 6,431,827 | B1 | 8/2002 | Wolfe et al. |
| 6,435,513 | B2 | 8/2002 | Skinner et al. |
| 6,439,844 | B1 | 8/2002 | Turnquist et al. |
| 6,460,857 | B1 | 10/2002 | Turnquist et al. |
| 6,553,639 | B2 * | 4/2003 | Hobbs et al. .................. 29/417 |
| 6,644,667 | B2 | 11/2003 | Grondahl |
| 6,685,427 | B1 | 2/2004 | Dhar et al. |
| 6,733,014 | B2 * | 5/2004 | Inoue ......................... 277/355 |
| 6,764,078 | B2 * | 7/2004 | Inoue ......................... 277/355 |
| 6,786,487 | B2 | 9/2004 | Dinc et al. |
| 6,786,488 | B2 | 9/2004 | Laurello et al. |
| 6,790,001 | B2 | 9/2004 | Turnquist et al. |
| 6,854,735 | B2 | 2/2005 | Sarshar et al. |
| 6,860,484 | B2 * | 3/2005 | Urlichs ....................... 277/412 |
| 6,874,788 | B2 | 4/2005 | Kono |
| 6,935,631 | B2 * | 8/2005 | Inoue ......................... 277/355 |
| 6,976,680 | B2 | 12/2005 | Uehara et al. |
| 7,066,468 | B2 | 6/2006 | Uehara et al. |
| 7,159,872 | B2 | 1/2007 | Nicholson et al. |
| 7,201,378 | B2 | 4/2007 | Kono |
| 7,419,164 | B2 * | 9/2008 | Awtar et al. .................. 277/418 |
| 2001/0030397 | A1 * | 10/2001 | Beichl ......................... 277/355 |
| 2002/0117806 | A1 * | 8/2002 | Grondahl .................... 277/355 |
| 2003/0042682 | A1 * | 3/2003 | Inoue ......................... 277/355 |
| 2003/0062684 | A1 * | 4/2003 | Inoue ......................... 277/355 |
| 2003/0062685 | A1 * | 4/2003 | Inoue ......................... 277/355 |
| 2003/0062686 | A1 | 4/2003 | Uehara et al. |
| 2004/0150165 | A1 * | 8/2004 | Grondahl .................... 277/355 |
| 2004/0256810 | A1 | 12/2004 | Nakano et al. |
| 2005/0194745 | A1 | 9/2005 | Hogg |
| 2006/0033285 | A1 | 2/2006 | Nishimoto et al. |
| 2006/0208427 | A1 | 9/2006 | Wright et al. |
| 2006/0210392 | A1 | 9/2006 | Enderby |
| 2008/0061513 | A1 * | 3/2008 | Awtar et al. .................. 277/355 |

FOREIGN PATENT DOCUMENTS

| | | |
|---|---|---|
| EP | 1 298 368 | 4/2003 |
| EP | 1 302 708 | 4/2003 |
| EP | 0 933 567 | 11/2006 |
| EP | 1 479 952 | 1/2007 |

OTHER PUBLICATIONS

Nakane, H. et al., "The Development of High-Performance Leaf Seals," Transactions of the ASME, Journal of Engineering for Gas Turbines and Power, vol. 126, Apr. 2004, pp. 342-350.

Watanabe, Eiichiro et al., "Development of New High Efficiency Steam Turbine," Mitsubishi Heavy Industries, Ltd. Technical Review, vol. 40, No. 4, Aug. 2003, pp. 1-6.

* cited by examiner

CIRCUMFERENTIAL VIEW

SHAFT SEAL USING SHINGLE MEMBERS

BACKGROUND OF THE INVENTION

The invention relates to sealing structures between a rotating component and a static component typically found in turbomachinery and, more particularly, to a compliant-plate seal arrangement including staggered shingles that are effective in reducing axial leakage.

Dynamic sealing between a rotor (e.g., rotating shaft) and a stator (e.g., static shell, casing or housing) is an important concern in turbomachinery. Several methods of sealing have been proposed in the past. In particular, sealing based on flexible members has been utilized including seals described as leaf seals, brush seals, finger seals, shim seals, etc.

A brush seal is comprised of tightly packed generally cylindrical bristles that are effective in preventing leakage because of their staggered arrangement. The bristles have a low radial stiffness that allows them to move out of the way in the event of a rotor excursion while maintaining a tight clearance during steady state operation. Brush seals, however, are effective only up to a certain pressure differential across the seal. Because of the generally cylindrical geometry of the bristles, the brush seals tend to have a low stiffness in the axial direction, which limits the maximum operable pressure differential to generally less than 1000 psi. Radial and axial directions in this context are defined with respect to the turbo-machine axis.

To overcome this problem, leaf seals have been proposed that include a plate-like geometry with higher axial stiffness and therefore the capability of handling large pressure differentials. Axial leakage, however, remains a problem due to the leaf seal geometry. That is, with reference to FIG. 1, if the uniform-thickness leaves L are packaged tightly close to the rotor R, there will be gaps G at the leaf roots, which potentially cause leakage and in turn can offset the benefits of the seal.

BRIEF DESCRIPTION OF THE INVENTION

In an exemplary embodiment of the invention, a shaft seal reduces leakage between a rotating shaft and a stator. The shaft seal includes a plurality of compliant-plate members attached to the stator in facing relation, the compliant-plate members defining a sealing ring between the stator and the rotating shaft. Each of the compliant-plate members includes a plurality of shingles, wherein adjacent compliant-plate members are disposed relative to each other such that the shingles are at least partially staggered in a direction of axial leakage. This preferred embodiment of compliant-plate seals is also referred to as a shingle seal.

In another exemplary embodiment of the invention, a method of manufacturing a shaft seal for reducing leakage between a rotating shaft and a stator includes the steps of (a) providing a plurality of compliant-plate members, each including a plurality of shingles; (b) attaching the plurality of compliant-plate members to the stator in facing relation, the compliant-plate members defining a sealing ring between the stator and the rotating shaft; and (c) positioning adjacent compliant-plate members relative to each other such that the shingles are at least partially staggered in a direction of axial leakage.

DETAILED DESCRIPTION OF THE INVENTION

In a conventional leaf seal, because the leaves are packed tightly at the tips and loosely at the roots, leakage from high pressure side to low pressure side entering the leaf pack tends to flow/expand radially outwards, then flows axially, and finally converges as it exits the leaf pack. The compliant-plate seal described herein significantly reduces the above-mentioned axial leakage with structure that is geometrically and functionally a hybrid between a conventional compliant-plate seal and a conventional brush seal. The geometric configuration of the compliant-plate seal described herein, also known as a shingle seal, is such that it retains the low leakage attributes of the brush seal owing to a staggered arrangement of shingles, as well as the high pressure-differential capability of conventional leaf seals owing to the plate shaped shingle members.

Figure 2:
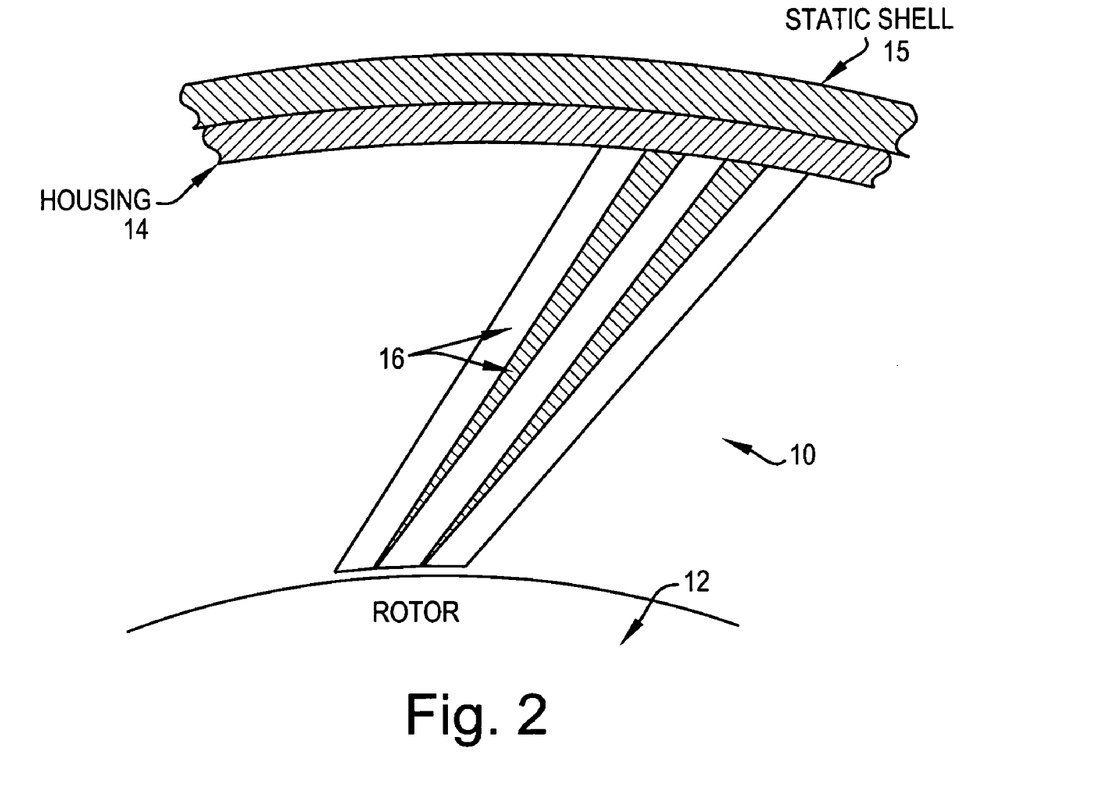
FIG. 2 is an axial view of the shingle seal described herein.
Figure 3:
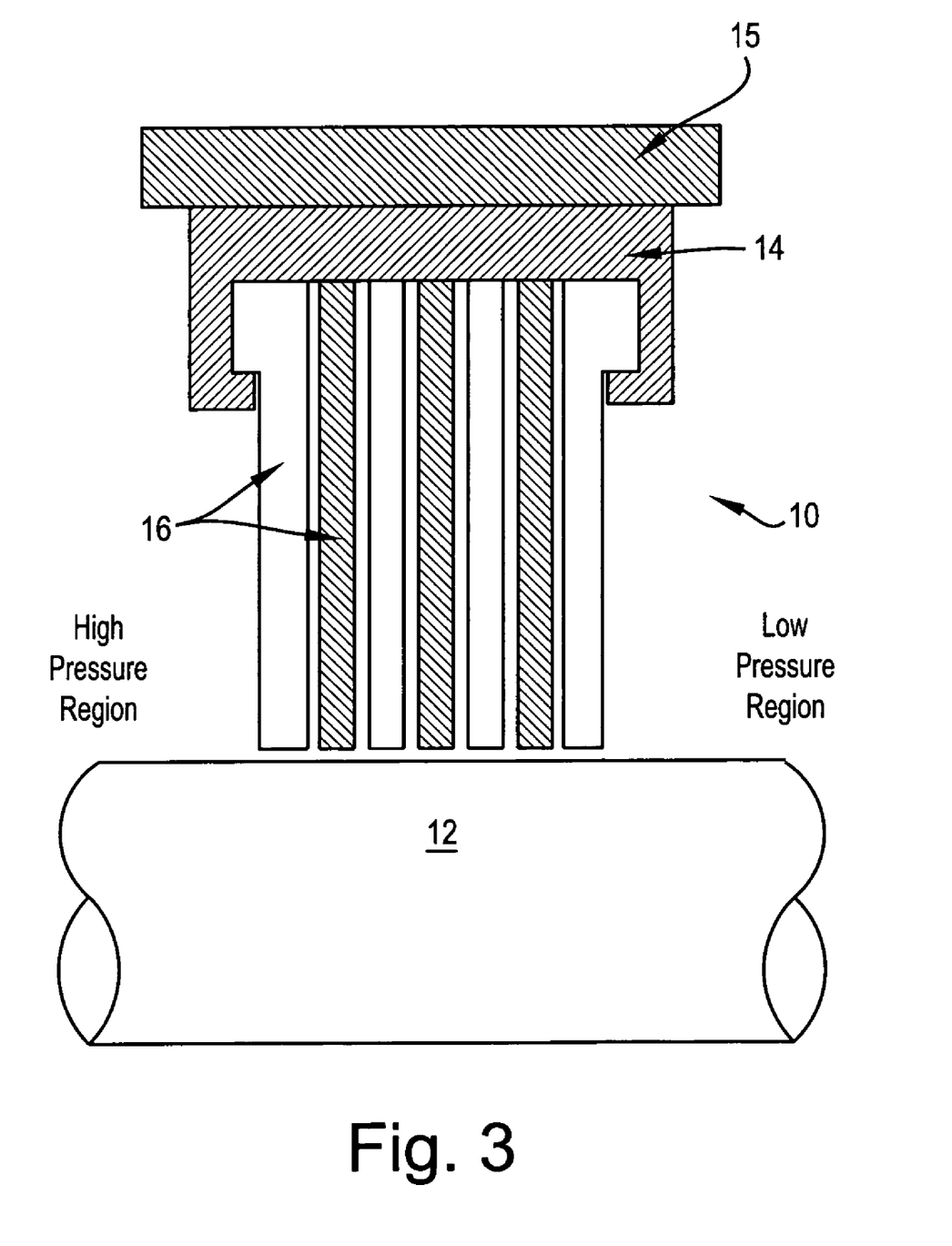
FIG. 3 is a circumferential view of the shingle seal described herein.

With reference to FIGS. 2 and 3, a shaft seal or shingle seal 10 serves to reduce axial leakage, from a high pressure region to a low pressure region, between a rotor 12, such as a rotating shaft, and a housing 14, attached to a stator 15. The shaft seal 10 is provided with a plurality of compliant plate members 16 secured at their roots in facing relation (i.e., face-to-face) to the housing 14, which in turn is assembled with the stator 15. This arrangement of compliant plate members 16 defines a sealing ring between the housing 14 and the rotating shaft 12.

Figure 4:
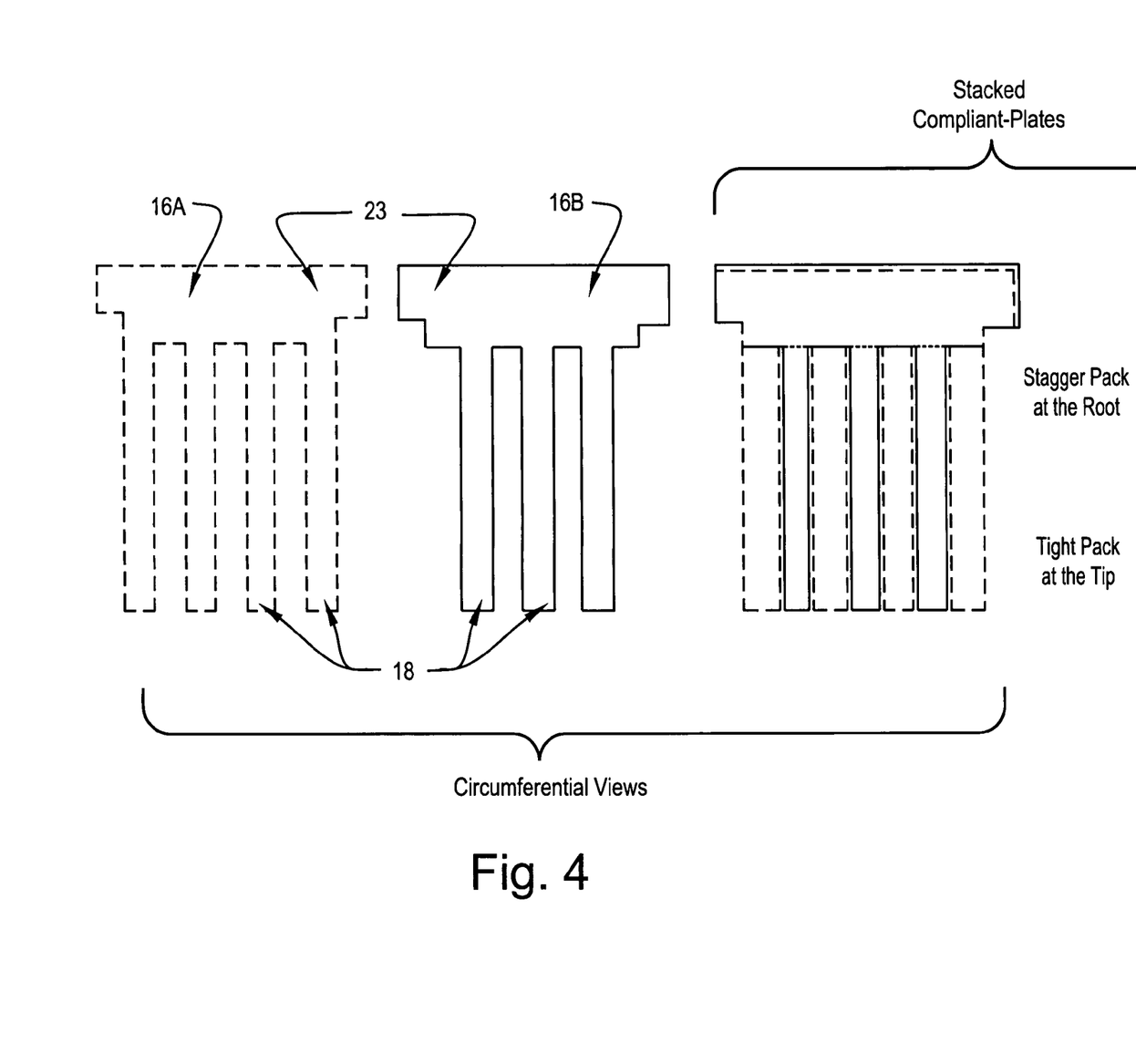
FIG. 4 shows circumferential views of alternating compliant-plate members, individually and stacked together, in the shingle seal described herein.
Figure 9:
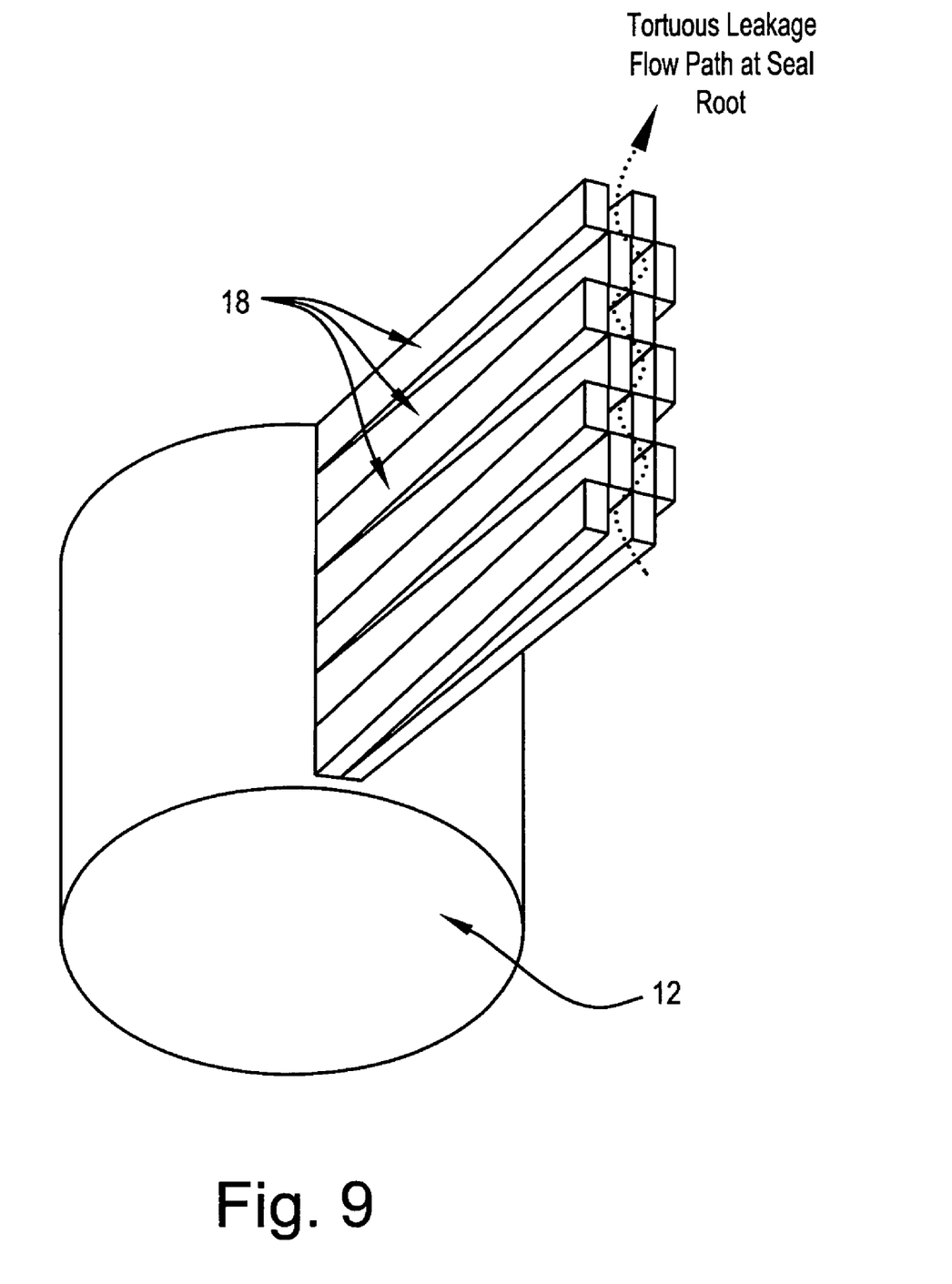
FIG. 9 is a cross-sectional perspective view of the shingle seal root end.
Figure 10:
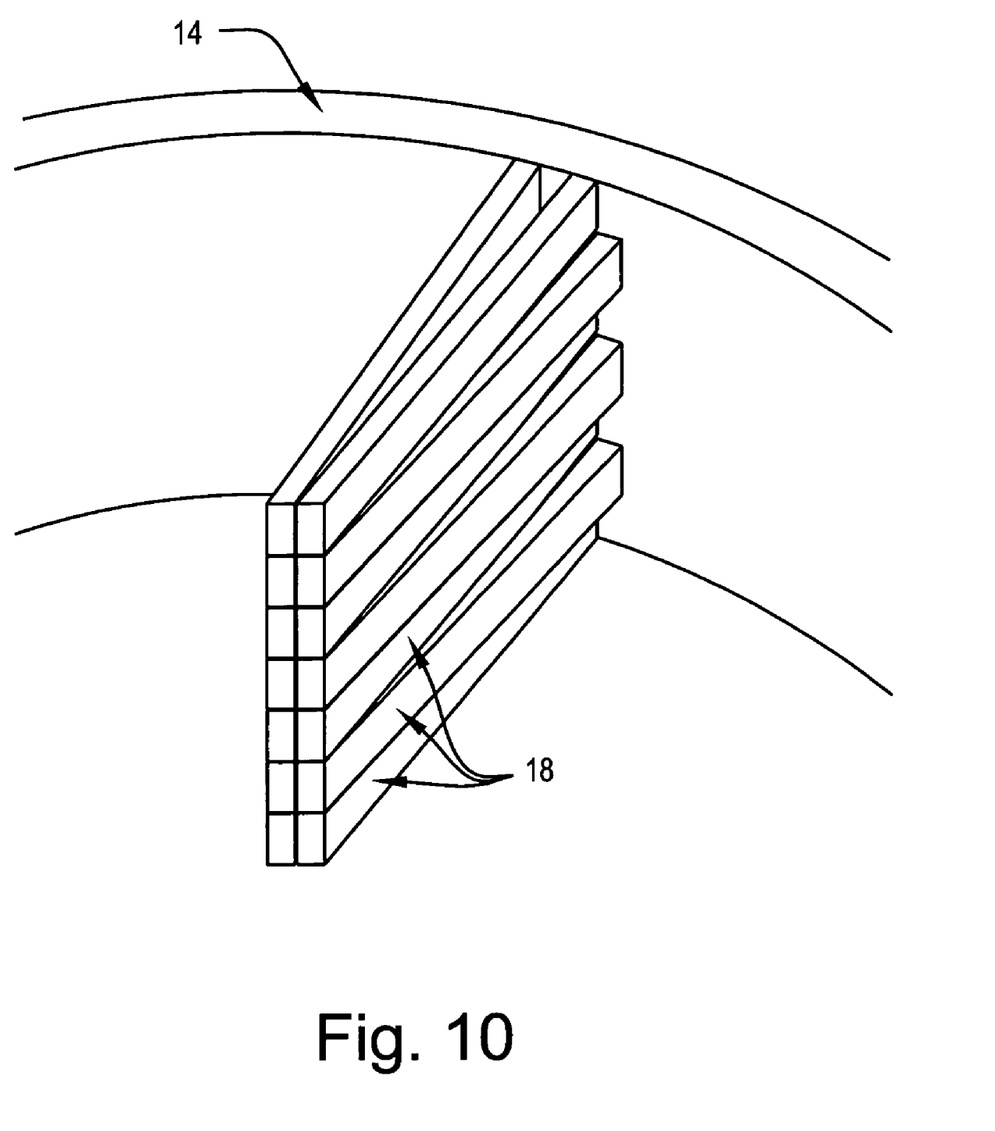
FIG. 10 is a cross-sectional perspective view of the shingle seal tip end.
Figure 11:
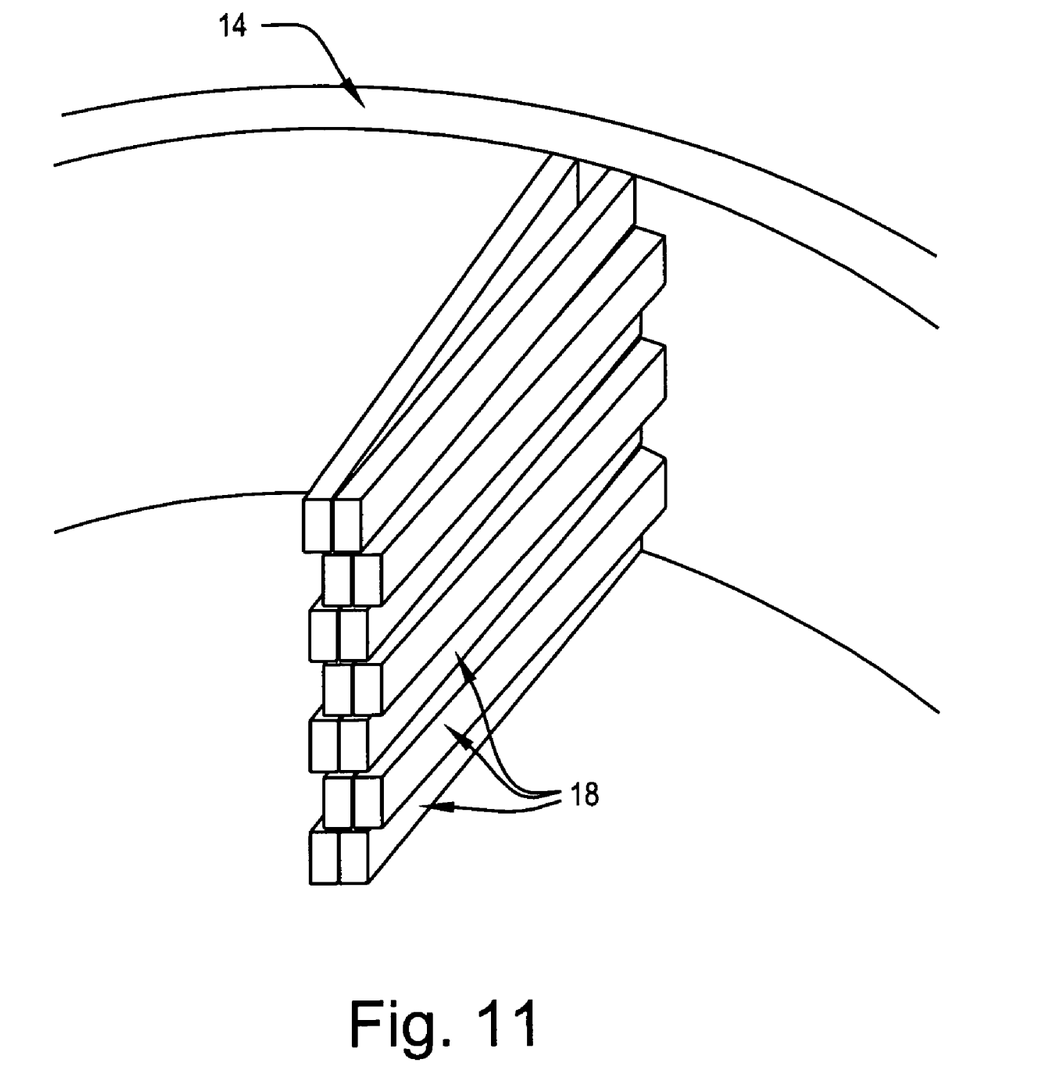
FIG. 11 is a cross-sectional perspective view of the shingle seal tip end in an alternate embodiment.

The exemplary shingle seal described herein includes at least two kinds of compliant-plate members 16A, 16B as shown in FIG. 4. The compliant-plate members 16A, 16B are stacked alternately. As shown in FIG. 4, each of the compliant-plate members 16A, 16B resembles a comb and includes a plurality of shingles 18. Adjacent compliant-plate members 16A, 16B are disposed relative to each other such that the shingles 18 are at least partially staggered in a direction of axial leakage. As noted, axial direction in this context refers to the axis of the turbo-machine. That is, in the conventional leaf seal construction illustrated in FIG. 1, the leaves L are packed tightly close to the rotor R, and as a consequence, there are gaps G at the leaf roots, which potentially cause axial leakage. The shingle seal 10 described herein overlays adjacent compliant-plate members 16A, 16B so that their constituent shingles 18 are at least partially staggered to mitigate the axial leakage due to the gaps G in the conventional leaf seal. The shingles 18 are shown staggered in the direction of axial leakage in FIG. 2. See also FIGS. 9-11, FIG. 9 illustrating the tortuous leakage flow path at the seal root. While the FIGURES show only two sets of overlapping compliant-plate members (as seen in the axial view), more than two sets can be made to overlap in a similar fashion depending on overall requirements and geometric constraints of the seal 10 such as seal outside diameter, seal inside diameter, leaf length, leaf stiffness, etc.

Figure 22:
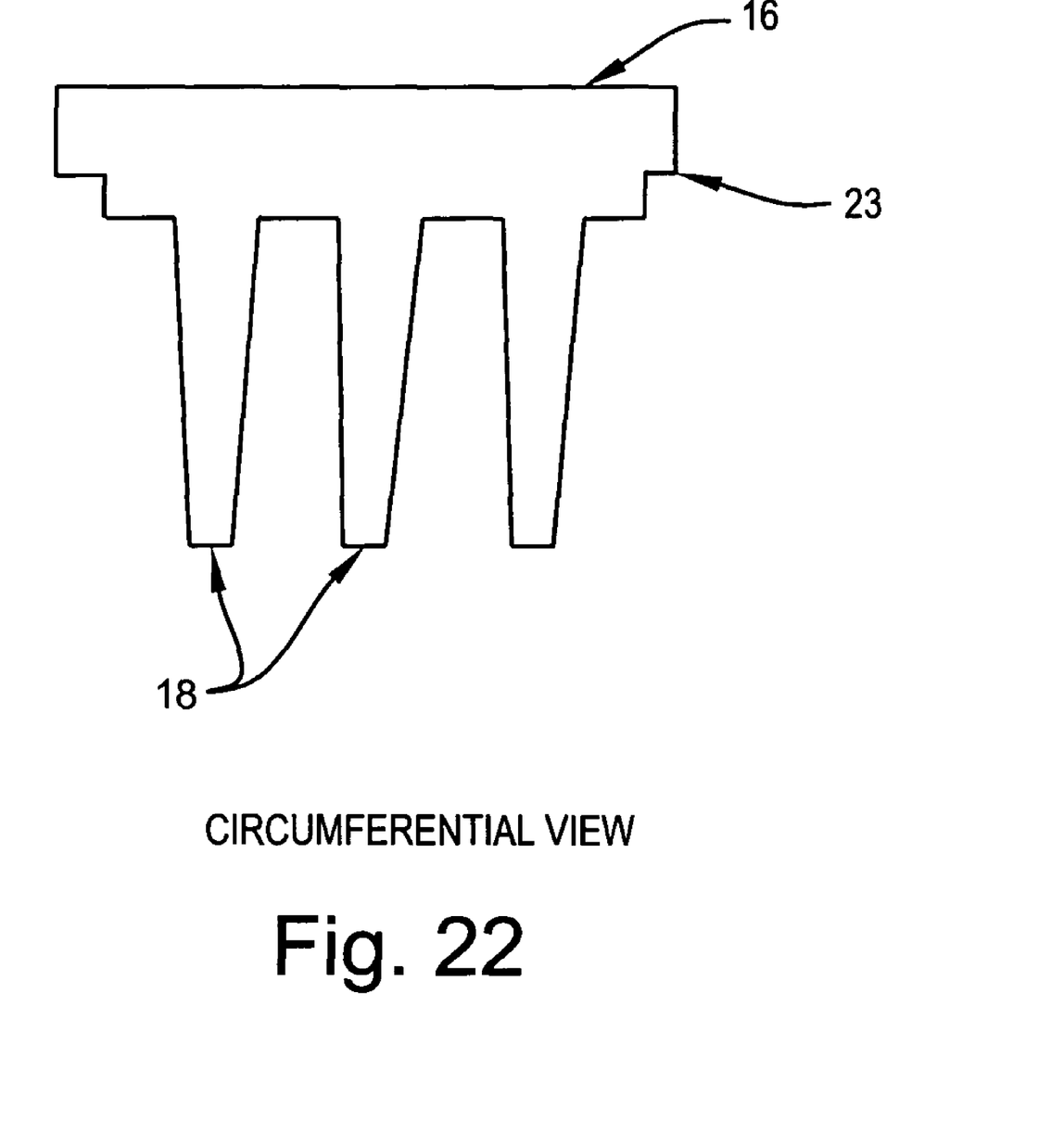
FIG. 22 shows an exemplary compliant-plate member of an alternative shape in the circumferential view.

The shingles 18 are preferably rectangular in the circumferential view as shown in FIG. 4. The invention is not meant to be limited to this shape, however, as other shapes may alternatively be used. Any shape such as, but not limited to, rectangle, T-shape, stepped, triangle, trapezoid, elliptical, hexagonal, etc. or other irregular shapes may be suited for a particular application and its requirements. An exemplary compliant-plate member of an alternative shape is shown in FIG. 22. Furthermore, although the cross-section of individual shingles as seen in FIGS. 9-11 is rectangular, the invention is not limited to this cross-section shape. Elliptical, hexagonal or other cross-section shapes may also be utilized depending on the given application. The overall number of shingles 18 per shingle seal assembly may vary from as few as two to any large number, such as seven shown in FIG. 3, as required by a specific application. In general, a larger number of shingles in a shingle seal may increase the sealing performance because this increases the number of convolutions in the leakage flow path (see FIG. 9). Furthermore, the width of the shingles 18 may vary within a shingle seal assembly as shown in FIG. 3.

Figure 5:
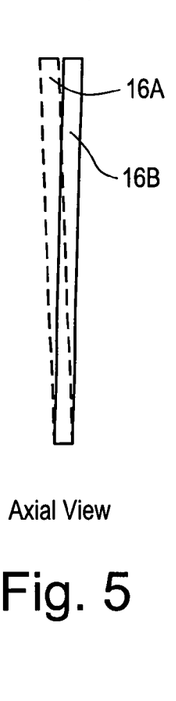
FIG. 5 is an axial view of the stacked compliant-plate members in the shingle seal.

FIG. 5 is axial view showing adjacent compliant-plate members 16A, 16B. Due to the relative positioning of the shingles 18 of the adjacent compliant-plate members 16A, 16B, the shingle seal 10 enables the shingles 18 of the adjacent compliant-plate members 16A, 16B to be interposed at their respective tips so that a thickness of the adjacent compliant-plate members 16A, 16B at their tips is effectively equal to a thickness of a single compliant-plate member. Thus, compliant-plate members 16A and 16B, stacked together, provide a geometry with an effective thickness that is double the compliant-plate thickness at the root, and equal to the compliant-plate thickness at the tip. While the axial view in FIG. 5 shows a two plate thickness at the seal root gradually transitioning to a single plate thickness at the seal tip, the shingle seals 10 may be designed such that the effective thickness on the seal root is a non-integral multiple of the compliant-plate thickness. Similarly, the shingles 18 may have a partial overlap at the root itself, unlike in FIG. 5 where there is no overlap at the seal root. The choice of effective thickness at the seal is generally determined by overall requirements and geometric constraints of the seal such as seal outside diameter, seal inside diameter, compliant-plate length, compliant-plate stiffness, etc.

Figure 1:
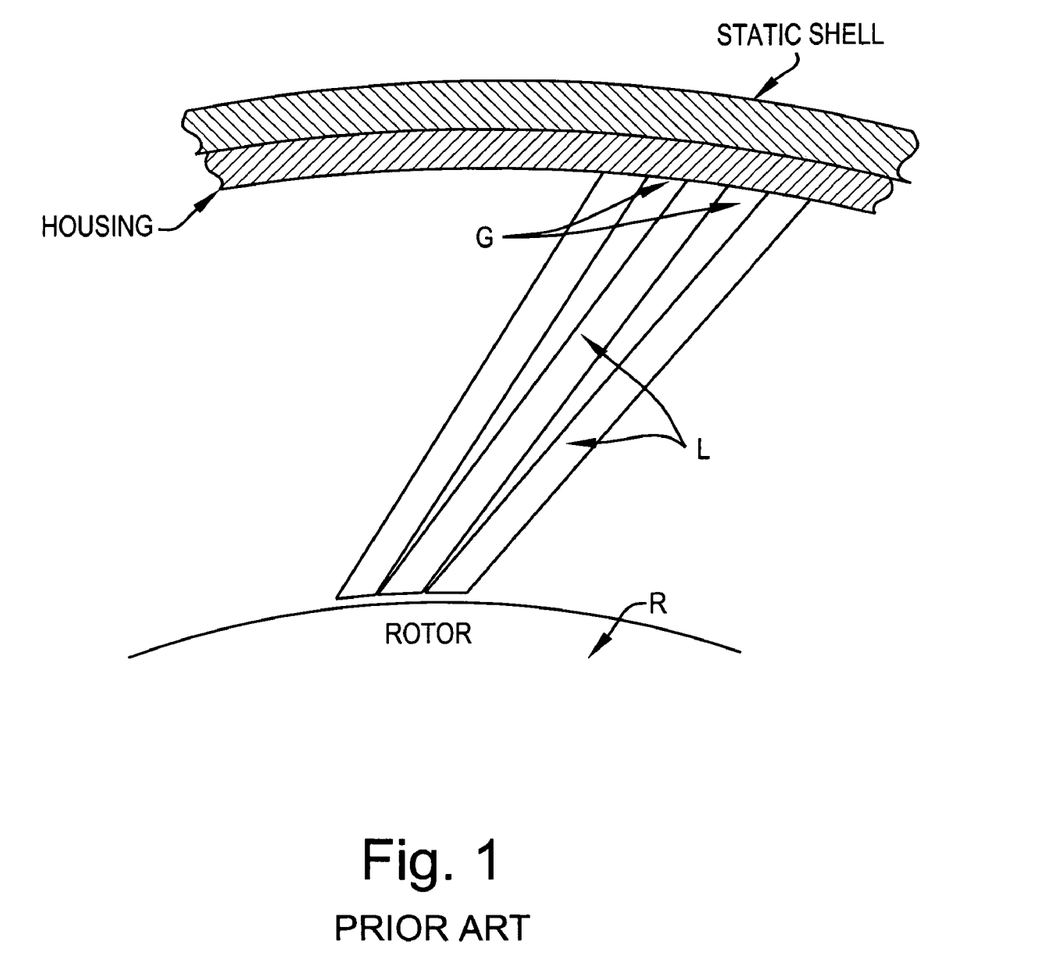
FIG. 1 is an axial view of a conventional leaf seal.

In the conventional leaf seal as shown in FIG. 1, the significant leakage path is due to the gaps G at the leaf roots that allow a straight unobstructed line of flow. In the shingle seal 10 described herein, the staggered shingle arrangement at the root significantly reduces axial leakage in a fashion similar to a conventional brush seal (see the leakage flow path in FIG. 9). Furthermore, each shingle 18 in the comb-like compliant-plate structure maintains a high axial direction stiffness and a low radial direction stiffness, thus retaining the advantages of the conventional leaf seal. In fact, the high axial stiffness helps ensure that the shingles 18 do not bind or catch with adjacent shingles 18.

Figure 6:
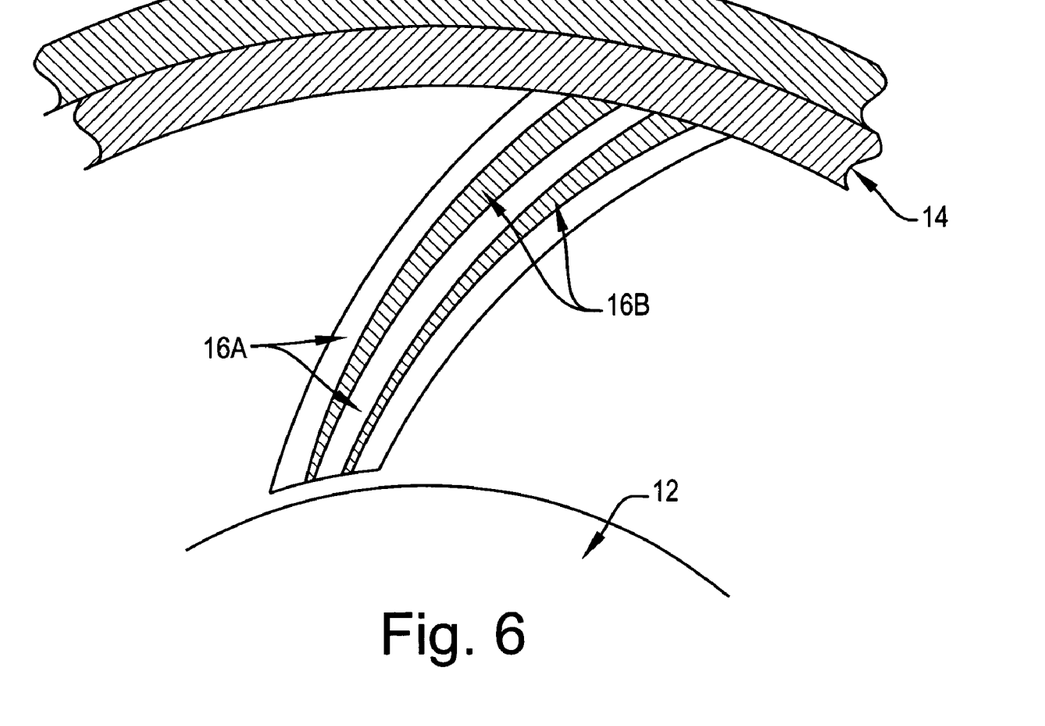
FIG. 6 is an axial view of curved compliant-plate members in an alternative embodiment of the shingle seal.

The compliant-plate members 16 and therefore the shingles 18 may not be straight or of uniform thickness as seen in the axial view, but rather could be curved or tapered. FIG. 6 shows exemplary compliant-plate members 16 with a curvature. Furthermore, different shingles 18 within the same compliant-plate member 16 can have different taper and/or curvature.

The compliant-plates 16 may be coated or surface-treated with special materials to achieve one or more of the following objectives: minimize friction, wear and heat generation during relative sliding, act as diffusion barrier during manufacturing, allow high temperature operation, and improve seal life. The surface of the rotor, which is in close proximity to the compliant-plate tips may also be coated for the above or other reasons. Common coating methods include Physical Vapor Deposition, thermal spray and galvanic deposition, to name a few. Coating materials include, but are not limited to, Titanium Nitride, Zirconium Nitride, NickelChrome-Chrome-Carbide along with solid lubricants, Nickel, etc.

Each compliant-plate and/or shingle may have additional features at the root to enable assembly steps such as, but not limited to, alignment, fixturing and spacing. A typical example is a T-shape feature 23 at the compliant-plate root shown in FIGS. 3 and 4. See also FIGS. 7, 8, 13, 18 and 22.

Figure 7:
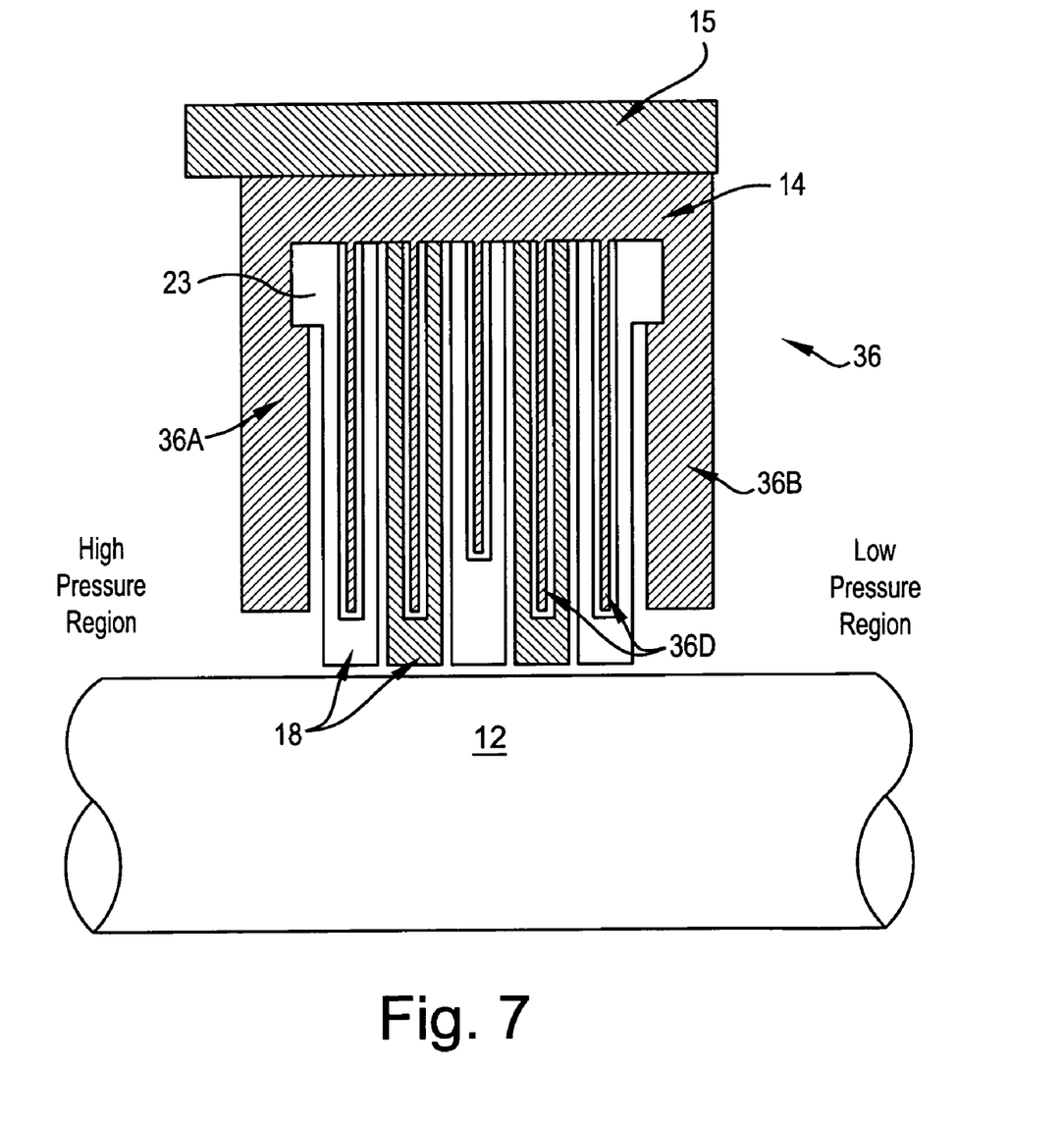
FIGS. 7 and 8 show a circumferential view of a shingle seal embodiment that incorporates front, back and intermediate rings.
Figure 8:
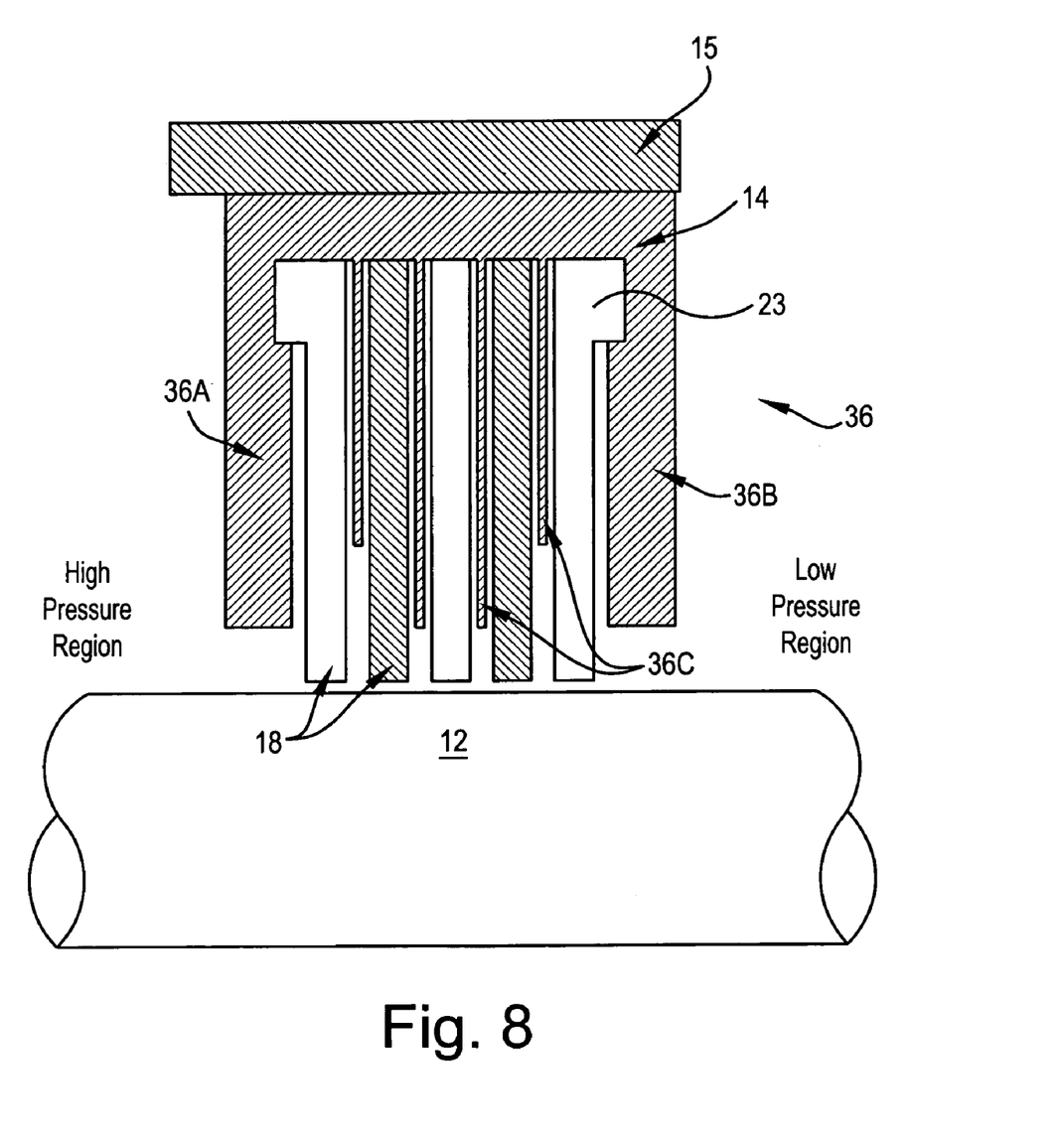

Additionally, there may be provided further vertical features such as rings 36, attached to the static shell 15 or housing 14, seen in the circumferential view in FIGS. 7 and 8. The rings 36 may be disposed axially ahead of shingles (front ring 36A), axially behind the shingles (back ring 36B), between the rows of shingles (intermediate ring 36C in FIG. 8), or within the shingles (interior ring 36D in FIG. 7), which provide axial support to the shingles 18, further reduce axial leakage flow, and provide control over shingle deflection behavior such as lift, blow-down and twist.

Figure 12:
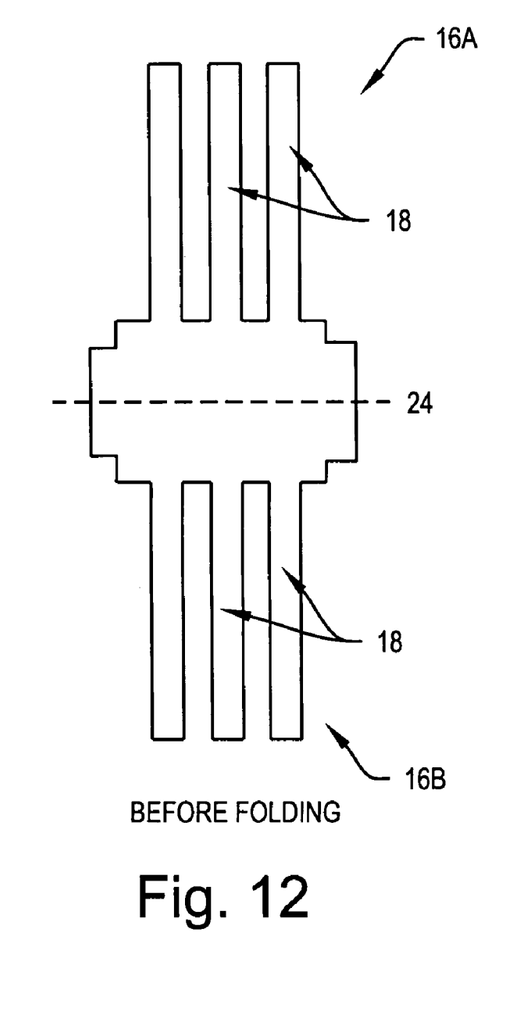
FIGS. 12 and 13 illustrate a manufacturing method for forming the shingle seal described herein.
Figure 13:
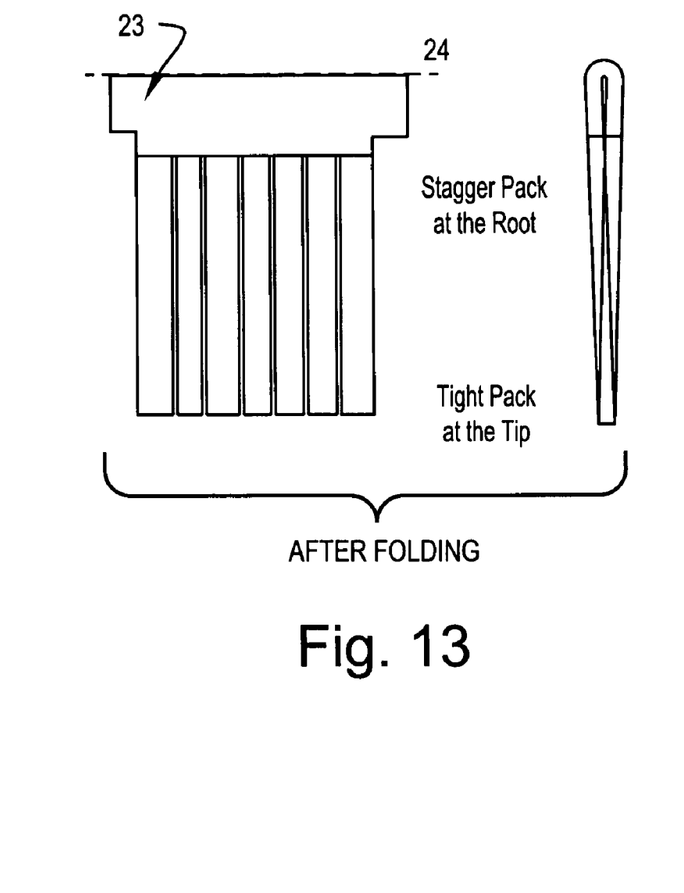

Referring to FIG. 4, the compliant-plate members 16A, 16B may be individually fabricated using any suitable method such as wire-EDM, stamping, etching, etc. After fabrication, the compliant-plate members 16A, 16B are assembled alternately using an alignment feature, for example, a T-shape section 23, and joined by welding or the like at the seal root. Alternatively, the adjacent compliant-plate members 16A, 16B can be fabricated together as a single piece then folded along a line 24 passing through the leaf root, as shown in FIGS. 12-13. The T-section 23 may be incorporated to allow alignment and assembly with other similar folded shingle-structure pairs. The folding line 24 can be marked by means of coining, etching etc.

Figure 14:
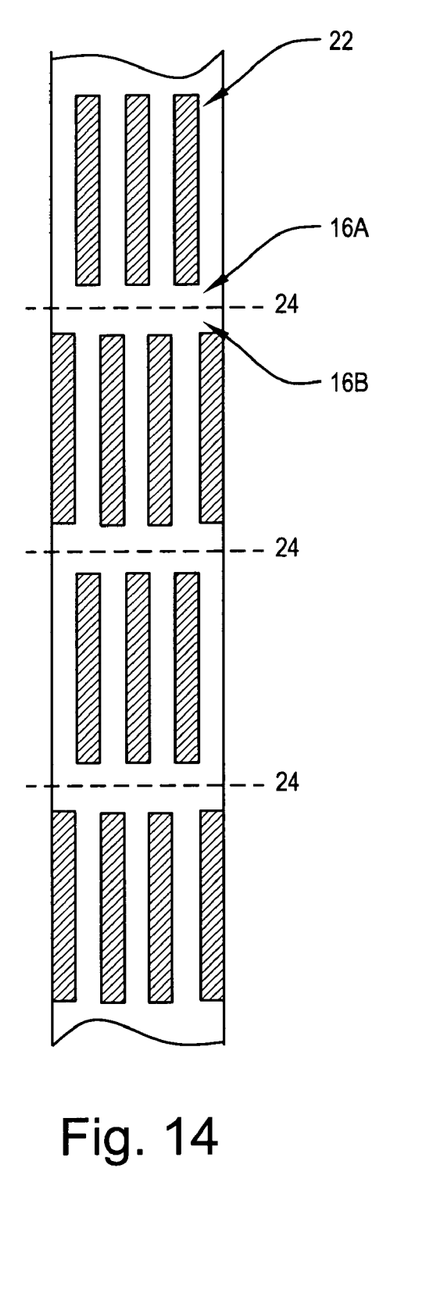
FIGS. 14-18 illustrate an alternative manufacturing method for forming the shingle seal described herein.
Figure 15:
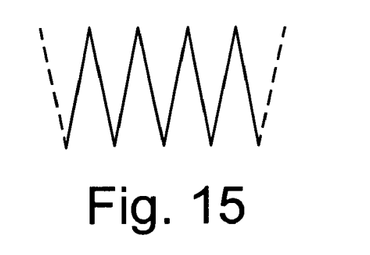
Figure 16:
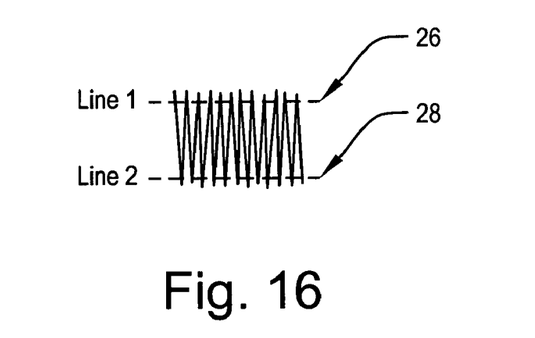
Figure 17:
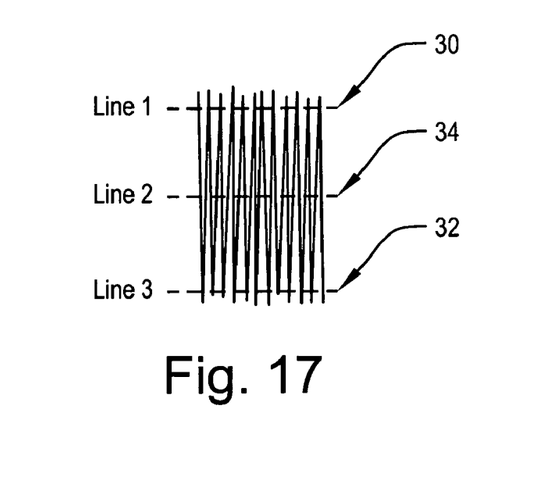

An alternative option for fabricating the compliant-plate members is illustrated in FIGS. 14-18. FIG. 14 illustrates a continuous roll of strip material 22 including alternately structured compliant-plate members 16A, 16B and fold lines 24 between them. The structures for the compliant-plate members 16A and 16B may be produced on the strip material 22 by means of processes such as etching, punching, stamping, or EDM etc. The shaded regions in FIG. 14 are removed by such a process. Subsequent to this step, the strip material 22 can be folded alternately along the fold lines 24 in an accordion shape as shown in FIG. 15. The fold lines 24 may also be created as part of the punching or etching process. Once folded, the accordion shape can be stacked tight and trimmed, using, for example, wire-EDM, along line (1) 26 and joined using welding or the like along line (2) 28 (FIG. 16). The resulting assembly of compliant-plate members 16 can then be folded to a desired curvature and attached to other components of the seal 10. Furthermore, an accordion may be made as shown in FIG. 17 where the compliant-plate members 16 are joined along line (1) 30 and line (3) 32, and the compliant-plate members 16 are cut along line (2) 34. This arrangement fabricates two shingle seal assemblies simultaneously.

Figure 18:
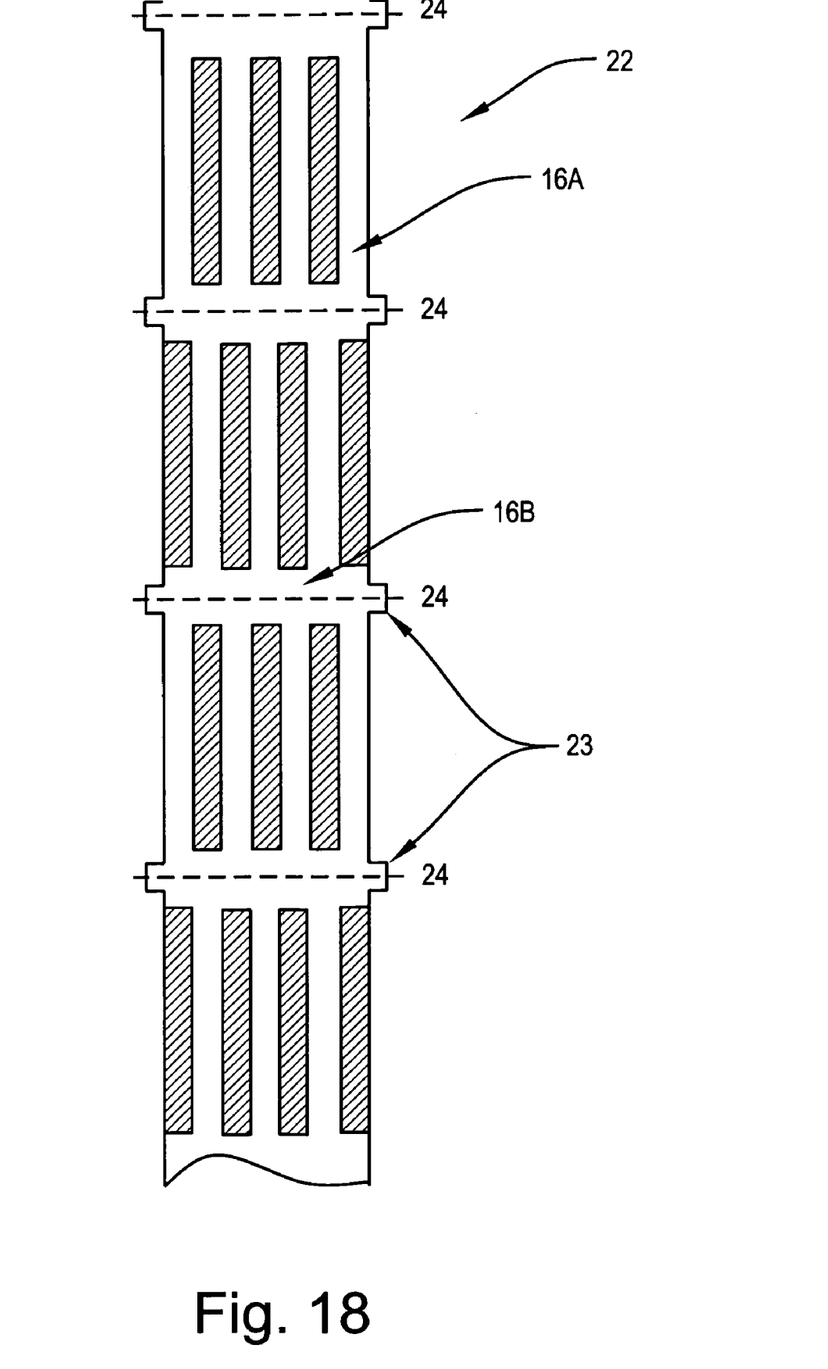

Additionally, the strip material 22 may incorporate the T-shaped section 23, as shown in FIG. 18, for the purpose of subsequent alignment and assembly. After alternatively folding along fold lines 24, the resulting accordion-like stack may be joined on one end and trimmed on the other end. The joined end of the compliant-plate stack may then be slid into a housing with the necessary curvature that accommodates the T-shaped section of the stack.

An additional de-burring step can be included between the punching and folding steps, where the continuous unfolded strip may be made to pass between emery papers or similar de-burring devices. A single machine can be designed or configured to continuously perform all the above manufacturing steps in series.

As part of the punching process, dimples of controlled depth may be formed on the strip material in the seal root area so as to provide any necessary spacing between the members. Other spacing features such as controlled thickness coating may also be incorporated.

The described methods provide fabrication processes that allow integral multiples of the compliant-plate effective thickness at the seal root. Other practical manufacturing methods, one of which is described below, may be conceived that can allow fractional overlap (as seen in the axial view) or non-integral multiples of the compliant-plate effective thickness at the seal root.

Figure 19:
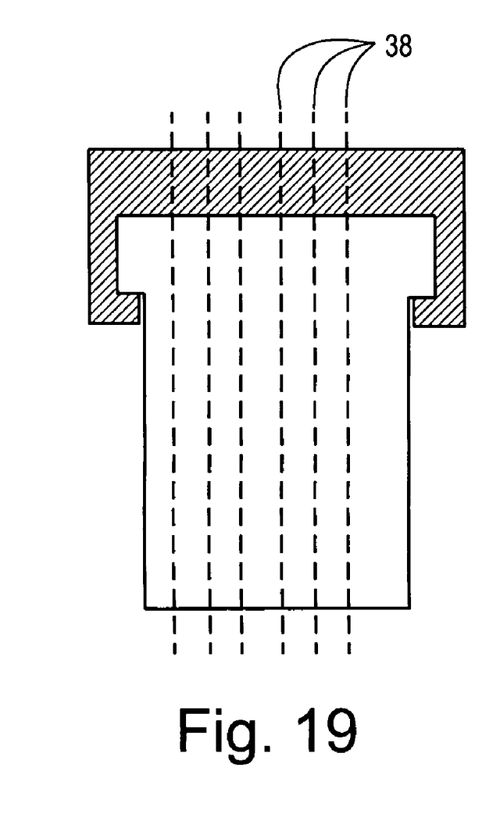
FIGS. 19-21 illustrate yet another alternative manufacturing method for forming the shingle seal described herein.
Figure 20:
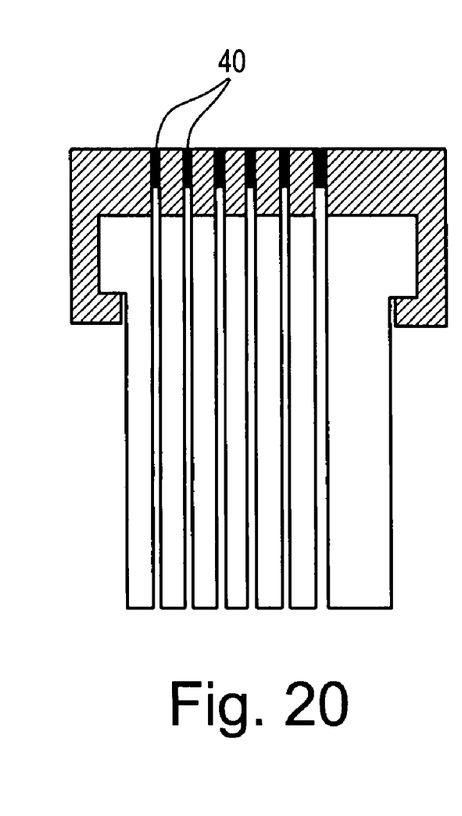
Figure 21:
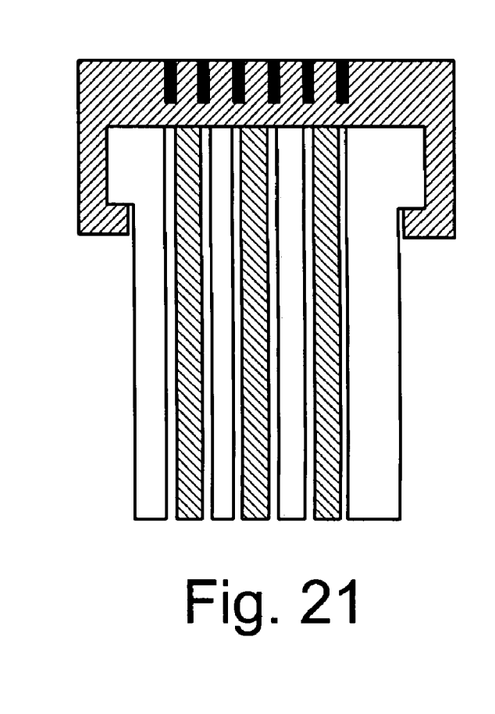

Still another alternative method of shingle seal fabrication utilizes a conventional leaf seal that may be cut vertically into several parallel segments of varying thickness using wire EDM or the like along cutting lines 38 shown in FIG. 19. This results in multiple seal segments that are spaced axially using spacer shims 40 shown in FIG. 20. Subsequently, the segments are rotated alternately with respect to each other, about the seal axis, to generate the necessary stagger between the shingles as shown in FIG. 21. Once this is achieved, the segments are rejoined.

The shingle seal described herein is geometrically and functionally a hybrid between a conventional leaf seal and a conventional brush seal. The geometric configuration of the described shingle seal is such that it retains the low leakage attributes of the brush seal owing to a staggered arrangement of shingles as well as the high pressure differential capacity of leaf seals owing to the plate shaped shingles.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A shaft seal for reducing leakage between a rotating shaft and a stator, the shaft seal comprising:
    a plurality of compliant-plate members attached to the stator in facing relation, the compliant-plate members being circumferentially stacked with facing surfaces oriented circumferentially to define a sealing ring between the stator and the rotating shaft,
    wherein each of the compliant-plate members comprises a plurality of shingles, and wherein adjacent compliant-plate members are disposed relative to each other such that the shingles, without circumferential interlocking, are at least partially staggered in a direction of axial leakage,
    wherein the stator is a housing attachable to a static shell, and wherein the housing comprises at least one radially extending circumferential ring disposed within a corresponding at least one of the plurality of shingles.

2. A shaft seal according to claim 1, wherein the compliant-plate members are attached to the stator at their root.

3. A shaft seal according to claim 1, wherein the compliant-plate members are attached to the stator at their root and define the sealing ring at their tip, and wherein the shingles of the adjacent compliant-plate members are interposed at their respective tips so that a thickness of the adjacent compliant-plate members at their tips is substantially equal to a thickness of a single compliant-plate member.

4. A shaft seal according to claim 1, wherein the compliant-plate members are attached to the stator at their root, and wherein the shingles of the adjacent compliant-plate members are interposed at their respective tips so that an effective thickness of the adjacent compliant-plate members at their tips falls between a thickness of a single compliant-plate member and a thickness of two side to side compliant-plate members.

5. A shaft seal according to claim 1, wherein the compliant-plate members are coated or surface treated to minimize friction, wear and heat generation, to prevent diffusion bonding during manufacturing, and to improve the shaft seal life.

6. A shaft seal according to claim 1, wherein the shingles are rectangular.

7. A shaft seal according to claim 1, wherein the shingles are irregularly shaped.

8. A shaft seal according to claim 1, wherein each of the compliant-plate members comprises shingles of different shapes.

9. A shaft seal according to claim 1, wherein the compliant-plate members comprise shingles of at least one of varying numbers and varying shapes in at least one of a cross-section, an axial view, or shingle width.

10. A shaft seal according to claim 1, wherein the adjacent compliant-plate members are connected at root ends thereof.

11. A shaft seal according to claim 10, wherein two of the adjacent compliant-plate members are formed from a single sheet and are folded at the root ends.

12. A shaft seal for reducing leakage between a rotating shaft and a stator, the shaft seal comprising:
    a plurality of compliant-plate members attached to the stator in facing relation, the compliant-plate members being circumferentially stacked with facing surfaces oriented circumferentially to define a sealing ring between the stator and the rotating shaft,
    wherein each of the compliant-plate members comprises a plurality of shingles, and
    wherein adjacent compliant-plate members are disposed relative to each other such that the shingles are at least partially staggered in a direction of axial leakage, and
    wherein the stator is a housing attachable to a static shell, the housing including at least one circumferential ring extending radially toward the rotating shaft, and wherein the at least one ring is disposed within a corresponding at least one of the plurality of shingles.

13. A shaft seal according to claim 12, wherein the at least one ring is disposed axially in front of the compliant-plate members.

14. A shaft seal according to claim 12, wherein the at least one ring is disposed axially behind the compliant-plate members.

15. A shaft seal according to claim 12, wherein the at least one ring is disposed between rows of the plurality of shingles.

* * * * *